United States Patent [19]

Ward

[11] 4,207,429
[45] Jun. 10, 1980

[54] CABLE SPLICING TECHNIQUE

[75] Inventor: Robert A. Ward, Lexington, Mass.

[73] Assignee: Plymouth Rubber Company, Inc., Canton, Mass.

[21] Appl. No.: 944,161

[22] Filed: Sep. 20, 1978

[51] Int. Cl.² ............... H02G 15/08; H02G 15/18; H01R 43/00
[52] U.S. Cl. ........................... 174/88 R; 156/49; 174/84 R
[58] Field of Search ............ 174/84 R, 88 R, 84 C; 156/49

[56] References Cited

U.S. PATENT DOCUMENTS

| | | | |
|---|---|---|---|
| 2,276,571 | 3/1942 | Grypma | 156/49 X |
| 2,452,823 | 11/1948 | Wright | 174/88 R |
| 3,187,088 | 6/1965 | Warner | 174/88 R X |
| 3,692,922 | 9/1972 | Sugimoto et al. | 174/88 R X |
| 3,717,717 | 2/1973 | Cunningham et al. | 174/88 R X |
| 3,777,048 | 12/1973 | Traut | 174/84 R X |
| 3,781,458 | 12/1973 | May | 174/84 R X |
| 3,984,912 | 10/1976 | Johnston et al. | 174/88 R X |

Primary Examiner—Roy N. Envall, Jr.
Attorney, Agent, or Firm—Weingarten, Maxham & Schurgin

[57] ABSTRACT

An electrical cable splicing technique in which each joined conductor is insulated with a self-fusing insulator pad of rubber which preferably is fabric reinforced, the insulated conductors then being wrapped with uncured vulcanizable rubber tape to build up the splice to dimensions of a jacket sleeve. The sleeve, which is of molded fabric reinforced rubber, is then installed and bonded to the splice area.

7 Claims, 8 Drawing Figures

CABLE SPLICING TECHNIQUE

FIELD OF THE INVENTION

This invention relates to electrical cable splices and more particularly to a cable splice and splicing method especially adapted for mining cable and other highly flexible power cables.

BACKGROUND OF THE INVENTION

Techniques for splicing electrical cables are well-known and include many different splicing methods to suit the electrical and mechanical requirements of a particular cable. In general, the conductors of two confronting cable sections to be joined are connected by electrical connectors, the conductors are insulated by wound layers of insulating tape and a jacketing structure is then provided around the splice by means of jacket tapes or a jacket sleeve.

For cables employed in severe environments, such as in a mine, known splicing techniques have usually required a specific sequence of steps employing specific materials to provide electrical and mechanical integrity. Often the splice technique requires specialized equipment and tools for making a completed splice. In many situations, however, special tooling is not available where needed, and particular splicing materials may not be at hand to produce the intended splice.

SUMMARY OF THE INVENTION

In brief, the present invention provides an improved splicing technique and cable splice which is usable with a wide variety of cables to provide a splice joint of good electrical and mechanical integrity to achieve unimpaired cable operation even under severe conditions. The invention is especially adapted to the splicing of mining cables, such as employed to power shuttle cars and other apparatus within a mine, but is equally applicable to many different single and multiple conductor jacketed cables. The novel splice can be readily made within a mine or other operating site and can accommodate a variety of connector elements which are likely to be at hand.

The novel splice includes a self-fusing insulator pad of rubber which preferably is fabric reinforced and which is sealed around each electrical connector joining the cable conductors, and an uncured vulcanizable rubber tape wound around the insulated conductors to build up the splice to dimensions of a jacket sleeve. The sleeve of molded fabric, reinforced rubber is then installed over and bonded to the splice area to complete the splice. The insulator pad serves to provide electrical insulation, dustproofing and waterproofing such that the spliced cable is electrically operational after installation of the pad. Mechanical protection is provided by the sleeve.

DESCRIPTION OF THE DRAWINGS

The invention will be more fully understood from the following detailed description taken in conjunction with the accompanying drawings in which.

DETAILED DESCRIPTION OF THE INVENTION

Figure 1:
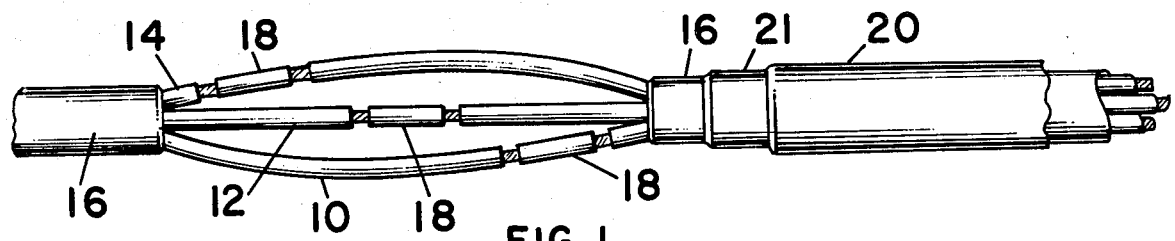
FIG. 1 is a side elevation view of a cable being spliced with the connectors in place.
Figure 2:
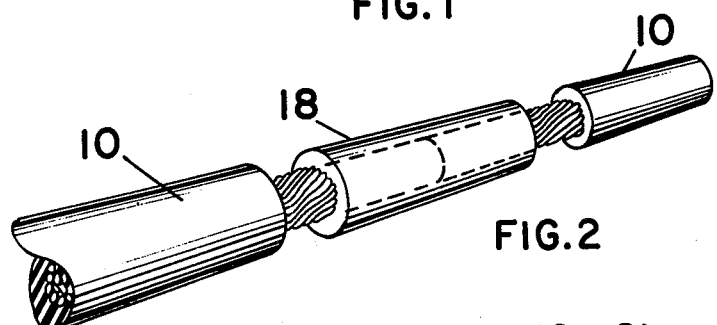
FIG. 2 is a cutaway pictorial view of a connector joining the confronting ends of a cable conductor.

Referring to FIG. 1, there is shown a cable which includes three insulated conductors 10, 12 and 14 contained within a jacket 16 and which is being spliced to a like section of cable. The insulation has been removed from the ends of each conductor to expose the ends thereof. The conductors are offset in length, in known fashion, such that each conductor joint is axially displaced from the other conductor joints. A connector 18 is secured to the confronting ends of respective conductors to provide electrical and mechanical joining of the conductors. The connectors 18 can be of any suitable or convenient form. For example, the conductors being joined can be butted, overlapped, or interwoven either partially or completely to provide with an associated connector the electrical interconnection. In the illustrated embodiment, the conductor ends are butted together and secured by a cylindrical connector 18, as also shown in FIG. 2. Prior to joining of the conductor ends, a molded jacket sleeve 20 is slipped over the end of one of the cables being joined, to be in position for installation over the splice area in a manner to be described.

Figure 3:
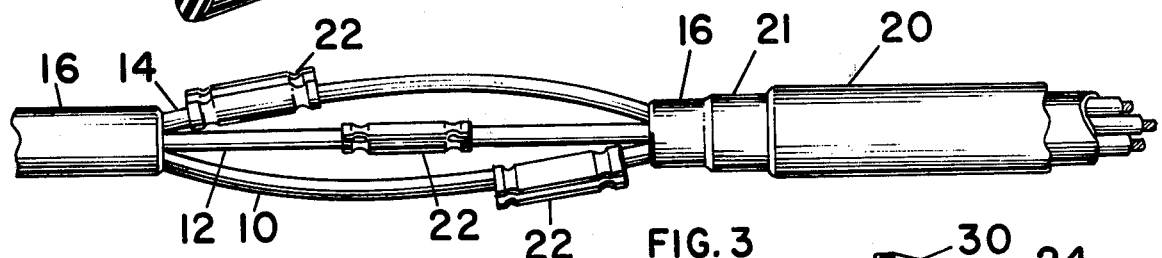
FIG. 3 is a sectional elevation view illustrating placement of the insulator pads over the joined conductors of the cable being spliced.
Figure 4:
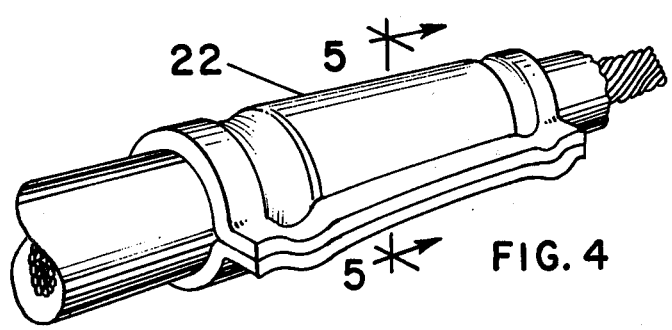
FIG. 4 is a cutaway pictorial view of an insulator pad over the joined conductors.
Figure 5:
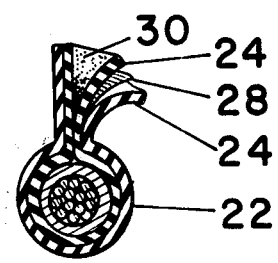
FIG. 5 is a sectional view taken along line 5—5 of FIG. 4.

After the electrical connections are made to the cable conductors, and to any ground or ground check conductors which are present, a rubber-based, self-fusing insulator pad 22 is installed over each connector 18 and over the adjacent exposed ends of the joined conductors. Each insulator pad is preferably fabric reinforced and is of a width to extend over the connector 18, any bare conductor and onto end portion of the conductor insulation, as shown in FIGS. 3 and 4. The insulator pads 22 are of multilayer construction and include a cohesive inner surface coating such that the pad can be wrapped around the conductor splice area with the cohesive layer against the connector, and bonded by pinching the ends of the pad together. The construction of the composite insulator pad is illustrated in FIG. 5 and in preferred embodiment includes a layer 24 of cured flame retardant neoprene with an interposed nylon woven mesh 28 molded therein to add rigidity to the pad and to distribute mechanical stress uniformly throughout the pad material. A cohesive material 30 is provided on the inner surface of the pad such that the pad can be readily bonded and sealed around the splice area. The insulative pad 22 is usually provided with cloth or other backing over the cohesive layer, and is of a convenient size which can be cut to suit the size of a particular splice. After cutting to size, the backing is removed from the pad, and the pad is installed in the manner described. After the cohesive surfaces are bonded by pinching the ends together, excess material is cut from the pad ends to leave a tab of about one-quarter inch to insure a tight seal. The spliced cable is, after installation of the insulation pads, electrically functional, although the splice is not yet mechanically protected.

Figure 6:
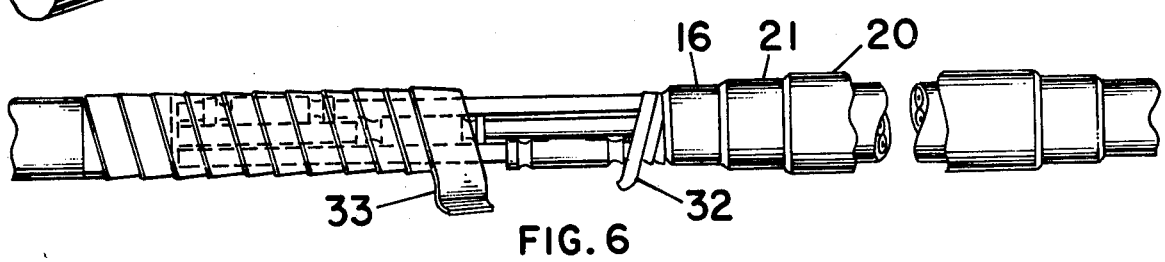
FIG. 6 is a side elevation view illustrating the taping of the insulated cable conductors.

The conductors are placed back into normal position, and an uncured vulcanizable neoprene tape 32 is wound around the conductors, as in FIG. 6, to build the splice area up to about the original cable jacket dimensions. The tape is wound, typically with half laps, over the entire splice area from one jacket end to the other to make a smooth taped splice area. The cable jacket ends are next cleaned, abraded and solvent wiped, and solvent cement is applied over the cleaned jacket areas. An uncured vulcanizable neoprene tape 33 is then applied over the splice area and the cemented jacket areas. Taping is accomplished from the beginning of one cemented jacket area, over the splice area, and to the end of the other cemented jacket area. The tape is built up to a dimension that will accept the jacket sleeve 20 with a firm fit. At the ends of this taped area, an additional half lap of tape can be applied to bind the taped ends of the jacket sleeve.

The uncured tape allows easy application and is self-fusing, soft and conforming to provide a smooth homogeneous splice area. This uncured tape is vulcanized by heat from the cable during electrical energization thereof such that the tape cures and fuses to provide a homogeneous and uniform insulation which replicates the characteristics and performance of the unspliced cable.

Figure 7:
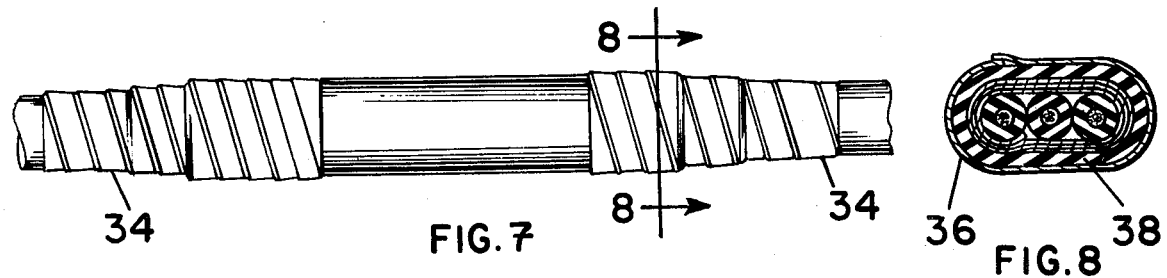
FIG. 7 is a side elevation view of the cable splice after installation of the molded sleeve and the end taping thereof.

The entire taped splice area is lightly coated with solvent cement, and the jacket sleeve 20 is slipped over the cemented splice while the cement is still wet, the sleeve being centered over the taped area. The cement serves to lubricate the sliding or installation of the jacket sleeve over the spliced area and then provides bonding of the sleeve to the spliced area. The sleeve 20 has stepped ends 21 which, after positioning of the sleeve over the splice area, are taped with cured neoprene tape 34 onto the cable jacket, as in FIG. 7, to provide smoothly tapered ends. For completion of the splice, a layer of plastic tape can be provided over the taped end portions of the sleeve.

Figure 8:
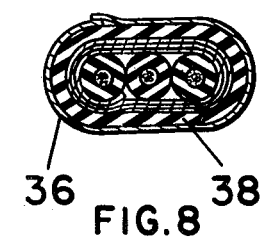
FIG. 8 is a sectional view taken along line 8—8 of FIG. 7.

The jacket sleeve 20 is molded of neoprene or other suitable rubber material and is strain free, having no preferential tear planes. As seen in FIG. 8, the sleeve is of composite construction having a nylon or other reinforcing mesh 36 molded into the neoprene wall 38 to prevent tear propagation through the wall in the event of cutting or nicking of the sleeve during use of the cable. The sleeve is molded to a configuration to correspond to the associated cable, and has inner dimensions larger than the corresponding cable dimensions. The sleeve is thus oversized and the splice area is built up to fit the sleeve to minimize stressing of the sleeve or the splice. As stated above, the sleeve provides mechanical protection for the splice, but the cable is operational even without the sleeve by virtue of the insulator pad.

While the novel splice technique is especially suited to mining cables such as 600–900 volt AC or DC cables, the technique is equally applicable to a wide variety of single and multiple conductor jacketed round or flat cables, with or without ground conductors or ground mesh, and with or without ground check leads. Accordingly, the invention is not to be limited except as indicated in the appended claims.

What is claimed is:

1. A method of making a splice between two sections of an electrical cable, each having at least one insulated conductor extending beyond the cable jacket, and an exposed end extending beyond the conductor insulation, the method comprising:
   electrically and mechanically joining the exposed ends of respective conductors of said sections;
   providing about each of the joined conductors and the ends of the conductor insulation an insulative pad of self-fusing rubber;
   repositioning the thus insulated spliced conductors;
   taping the splice area with an uncured, vulcanizable rubber tape from one jacket end to the other to build up the splice area to approximately the original jacket dimensions;
   cleaning the jacket ends on each side of the taped splice area;
   taping the cleaned jacket ends and intermediate taped splice area with an uncured rubber tape to build up to a predetermined dimension;
   coating the taped splice area with solvent cement;
   installing a molded jacket sleeve over the cemented splice area; and
   taping the ends of the jacket sleeve to the confronting portions of the cable jacket.

2. The method of claim 1 wherein said providing step includes wrapping the pad of self-fusing rubber around the joined conductors and the ends of the conductor insulation, and pinching the pad ends together to adhesively secure the pad to itself and to said joined conductors.

3. A cable splice for an electrical cable housing at least one insulated and jacketed conductor comprising:
   a connector joining the confronting exposed ends of each conductor being joined;
   a self-fusing insulative pad of rubber wrapped around the connector and exposed ends of each joined conductor and around the ends of the conductor insulation to electrically insulate each conductor;
   a first layer of uncured vulcanizable rubber tape wound over the thus insulated conductors between the ends of the cable jacket;
   a layer of cement over the jacket ends;
   a second layer of uncured vulcanizable rubber tape over the splice area and over the cemented jacket ends;
   a layer of cement over said second layer;
   a molded fabric reinforced rubber jacket sleeve over the cemented splice area; and
   a layer of tape between each end of the jacket sleeve and the confronting portion of the cable jacket.

4. The cable splice of claim 3 wherein said insulative pad includes a sheet of rubber and a layer of cohesive material wrapped around the connector and exposed ends of each joined conductor and around the ends of the conductor insulation, with the pad ends adhesively secured together.

5. The cable splice of claim 4 wherein said insulative pad is neoprene having a nylon reinforcing mesh therein.

6. The cable splice of claim 5 wherein said uncured tape is neoprene.

7. The cable splice of claim 6 wherein said molded jacket sleeve is neoprene.

* * * * *